April 1, 1969     W. A. CALDWELL     3,435,552

FLOATABLE TROTLINE

Filed June 27, 1966

INVENTOR
W.A. CALDWELL

BY *W. A. Caldwell*

ATTORNEYS

United States Patent Office 3,435,552
Patented Apr. 1, 1969

3,435,552
FLOATABLE TROTLINE
William A. Caldwell, Bartlesville, Okla., assignor to
L & H Manufacturing Co., Dallas, Tex.
Filed June 27, 1966, Ser. No. 560,411
Int. Cl. A01k 69/00, 91/04, 93/00
U.S. Cl. 43—43.15    6 Claims

ABSTRACT OF THE DISCLOSURE

A buoyant trotline structure for fishing is made by attaching a series of individual hooks to a foamed polyolefin staging by means of swivels which are limited in longitudinal movement along the line by small beads of plastic molded directly to the staging on each side of each swivel. Plastic beads are molded to synthetic fiber staging at fixed intervals by means of a mold through which the twine is run, there being a pair of spherical cavities spaced therein which are connected by conduit means with an electrically heated melt reservoir. The swivel is positioned on the twine between these two cavities and the beads thereafter molded directly to the line.

---

Figure 1:
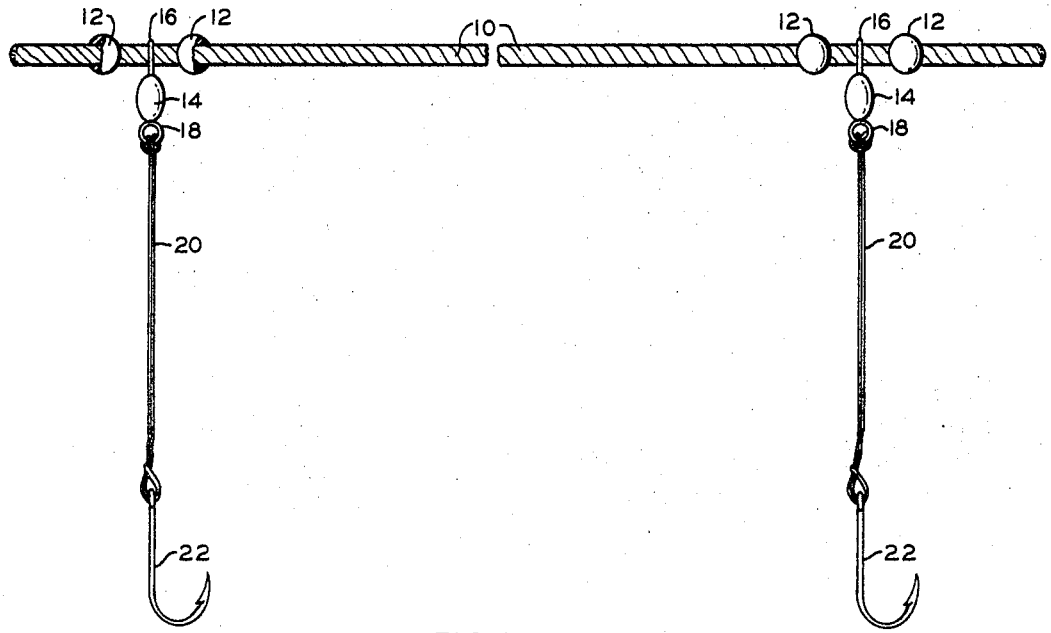

This invention relates to floating trotline structure and equipment.

Trotline fishing is an ancient art which has advanced very little over the years. Maintaining a line several hundred feet long with 50 to 100 or more hooks attached thereto at regular intervals by short branch lines without tangling so that it can be run in a selected spot in a lake or river in extended position is quite a problem. In addition to the problems of tangling and paying out line smoothly, there is the problem of catching the hooks and line on underwater snaps while paying out or running the line.

Ordinary trotlines are prone to tangle both in use and in storage. They also sink in water so that they lie on the bottom and deteriorate from ordinary rot and algae growth.

My invention is concerned with trotline materials and structure which eliminate or overcome the foregoing problems and substantially reduce the cost of a trotline.

Accordingly, it is an object of the invention to provide a buoyant, floatable trotline which facilitates setting or running the line. Another object is to provide a trotline material and arrangement which is free from rot and deterioration from algae growth. A further object is to provide a floating trotline which uses a novel and efficient means of holding the many separate hooks thereof in their attached position to the staging and prevents longitudinal movement on the staging without deterioration of the line. It is also an object of the invention to provide a strong, light, buoyant, attractive trotline which is difficult to tangle and which is relatively low in cost. Other objects of the invention will become apparent to one skilled in the art upon consideration of the accompanying disclosure.

My invention utilizes a foamed multifiber polyolefin staging of substantial size and strength having a series of individual hooks attached thereto by short lengths of line tied to one eye of a swivel with the staging passing through the other eye, the swivels being limited in longitudinal movement along the line by retainers closely spaced on each side of the swivel and fixed to the staging. A preferred embodiment of the invention comprises a foamed polypropylene staging in the form of 32-strand white baler or binder twine having brass barrel-type No. 1/0 swivels spaced at about 3' to 5' intervals thereon held in position by beads of polyethylene molded directly onto the staging on each side of the swivel leaving about 1" of line interval therebetween for swivel movement, there being an individual hook attached to the swivel by a relatively short (12" to 24") nylon line of suitable strength and color. Wall Rope Company's #550 foamed polypropylene baler or binder twine is excellent staging and very economical.

The staging may be formed of other foamed polyolefins or of foamed synthetic fibers of good strength. The retainers may also be formed of other moldable plastic than polyethylene. However, polypropylene twine formed of foamed fibers has excellent buoyancy and is inexpensive as compared to nylon; and polyethylene molds well to the polypropylene and strongly resists separation therefrom.

The polyolefin beads are molded to the twine staging at fixed intervals by means of a mold through which the twine is run, there being a pair of spherical cavities spaced therein which are connected by conduit means with an electrically heated melt reservoir. After molding a pair of bead retainers onto the line, the line is advanced through the mold another 3' to 5' for the next pair of beads and the procedure is repeated until the desired number of swivels are positioned on the twine. Of course, it is to be understood that a swivel is positioned on the twine at the proper interval before molding the beads thereto, one on each side of the swivel.

Other forms of retainers may be utilized, such as metal clamps which grip the line, but these are less satisfactory in that they damage the line, are not as stable, and are more costly.

Figure 2:
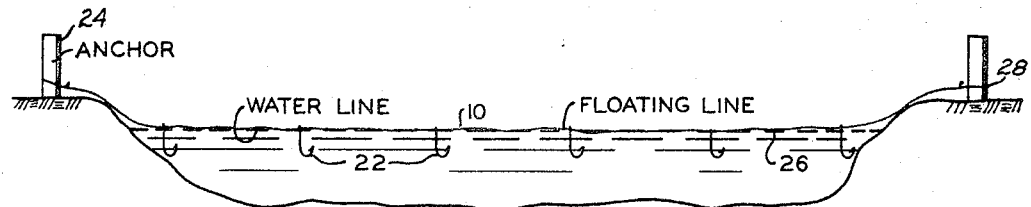
Figure 3:
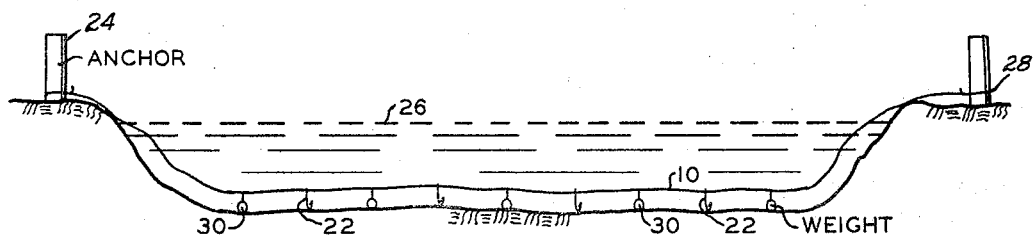

A more complete understanding of the invention may be had by reference to the accompanying schematic drawing of which FIGURE 1 is a plan view of a section of trotline made in accordance with a preferred embodiment of the invention; FIGURE 2 is an elevation through a lake or river illustrating the first stage of running the trotline; and FIGURE 3 is a similar view illustrating a trotline in place in a fishing location.

Referring to FIGURE 1, a section of trotline staging 10 in the form of foamed polypropylene binder twine has welded thereon at short intervals pairs of polyolefin beads 12 closely spaced (½" to 1½" or thereabouts) to restrict the longitudinal movement of barrel swivel 14, one eye 16 of which encircles the twine and the other eye 18 provides attachment for individual hook line 20 attached to hook 22. Line 20 is made of nylon and is preferably double, but it may be formed of other materials such as silk, linen, synthetic filament, etc.

Referring to FIGURE 2, line 10 is attached at one end to anchor 24 and the remaining line is strung out or run along the surface 26 of the water in the lake or stream with some slack in the line and the other end of the line is anchored as at 28 to a stake or other suitable fastening. Thereafter, as shown in FIGURE 3, weights 30 are attached to the trotline by short pieces of line to position the hooks 22 on, near, or well above the bottom by proper regulation of the length of line on the weights. In case it is desired to locate some baits at the bottom and others spaced well above the bottom, baits are placed on hooks by sections of the line and weight lines are adjusted in length to regulate the level of the section of hooks relative to the bottom.

Foamed polypropylene is quite elastic and this quality aids in its resistance the breakage. During the past few months, I have tested trotlines made in accordance with the invention using #550 white baler twine (32 strand polypropylene) from Wall Rope, a subsidiary of Phillips Petroleum Company of Bartlesville, Okla. I have caught a number of fish weighing over 20 pounds each and have had no trouble with breakage. In one instance, a hook which had held a 21-pound fish was found straightened out, indicating a much bigger fish, without breaking the twine. Also, pulling the trot line loose from underwater snags has failed to break this trotline.

The foamed polyolefin should have a density not greater than about 0.80 but not less than about 0.50. The polymer from which the line is fabricated may be a homopolymer, a copolymer, or a blend of polymers, so long as it has the necessary tensile strength and low density.

Certain modifications of the invention will become apparent to those skilled in the art and the illustrative details disclosed are not to be construed as imposing unnecessary limitations on the invention.

I claim:

1. A buoyant trotline structure for fishing comprising in combination:
   (a) a length of foamed multifilament polyolefin staging having the capacity of floating in water;
   (b) a plurality of spaced-apart swivels on said staging, said staging running thru one eye of each swivel; and
   (c) a pair of closely spaced plastic retainers for each swivel of (b), said retainers being molded directly to said staging, one on each side of said swivel to limit movement of said swivel along said staging.

2. The trotline structure of claim 1 including
   (d) a short fish line attached to the other eye of each swivel rotatable with the end of said swivel remote from said staging; and
   (e) a fish hook attached to each line of (d) remote from its swivel.

3. The trotline structure of claim 1 wherein said retainers are small spheres of polyolefin molded directly to said staging.

4. The trotline structure of claim 3 wherein said staging is formed of polypropylene and said retainers are formed of polyethylene.

5. The trotline structure of claim 2 wherein said staging is formed of foamed polypropylene baler or binder twine and said retainers are small spheres of polyolefin molded to said staging.

6. A trotline structure according to claim 1 wherein said staging is foamed polypropylene having a density within the range of 0.5 to 0.8, and said retainers are small spheres of polyolefin material.

References Cited

UNITED STATES PATENTS

| 2,033,701 | 3/1936 | Gibbs | 43—44.84 |
| 3,015,150 | 1/1962 | Fior | 43—44.98 X |
| 3,043,045 | 7/1962 | Martuch | 43—44.98 |
| 3,334,436 | 8/1967 | Cole | 43—44.98 |

DANIEL J. LEACH, *Primary Examiner.*

SAMUEL KOREN, *Assistant Examiner.*

U.S. Cl. X.R.

43—27.4, 44.84, 44.98